US012233564B2

(12) United States Patent
Haagsma

(10) Patent No.: US 12,233,564 B2
(45) Date of Patent: Feb. 25, 2025

(54) SPACING ASSEMBLY FOR A HAIR COMB

(71) Applicant: KONINKLIJKE PHILIPS N.V., Eindhoven (NL)

(72) Inventor: Hendrik Klaas Haagsma, Hoogeveen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 237 days.

(21) Appl. No.: 17/927,944

(22) PCT Filed: Jun. 18, 2021

(86) PCT No.: PCT/EP2021/066532
§ 371 (c)(1),
(2) Date: Nov. 28, 2022

(87) PCT Pub. No.: WO2021/259770
PCT Pub. Date: Dec. 30, 2021

(65) Prior Publication Data

US 2023/0226706 A1 Jul. 20, 2023

(30) Foreign Application Priority Data

Jun. 26, 2020 (EP) .................................... 20182466

(51) Int. Cl.
*B26B 19/20* (2006.01)
*B26B 19/38* (2006.01)

(52) U.S. Cl.
CPC .......... *B26B 19/20* (2013.01); *B26B 19/3886* (2013.01)

(58) Field of Classification Search
CPC ................ B26B 19/20; B26B 19/3886; H01H 2235/01; G01N 2035/0456
(Continued)

(56) References Cited

U.S. PATENT DOCUMENTS 1,877,749 A 9/1932 Matthew
9,132,568 B2 * 9/2015 Peterson ................ B27B 17/14
(Continued)

FOREIGN PATENT DOCUMENTS

CN 202277491 U 6/2012
CN 207888698 U 9/2018
(Continued)

OTHER PUBLICATIONS

International Search report and Written Opinion of PCT/EP2021/066532, dated Sep. 21, 2021.

*Primary Examiner* — Omar Flores Sanchez

(57) ABSTRACT

There is provided a spacing assembly (200) comprising a support body (210) and a moveable body (212) received in a guide track of the support body (210). The first guide track allows movement of the moveable body (212) in a spacing direction (203) but restricts the moveable body (212) in a lateral direction (205) perpendicular to the spacing direction (203). An adjuster (222) comprises first and second spiral channels (702, 704), which are arranged about a common point (706) on a surface of the adjuster (222) and engage a first lug (440) of the support body (210) and a second lug (442) of the moveable body (212), respectively, such that the adjuster (222) is rotatable about the common point (706). Rotation of the adjuster (222) drives the moveable body (212), under the lateral restriction of the first guide track (202), to move relative to the support body (210) in the spacing direction (203).

15 Claims, 6 Drawing Sheets

(58) Field of Classification Search
USPC ............................................................ 30/201
See application file for complete search history.

(56) References Cited

U.S. PATENT DOCUMENTS

| | | | | |
|---|---|---|---|---|
| 2007/0107234 | A1* | 5/2007 | Yao | B26B 19/3846 30/201 |
| 2008/0178468 | A1* | 7/2008 | Liao | B26B 19/3886 30/34.05 |
| 2013/0263457 | A1* | 10/2013 | Sobagaki | B26B 19/205 30/201 |
| 2014/0331503 | A1* | 11/2014 | Uit De Bulten | B26B 19/205 30/201 |
| 2023/0330877 | A1* | 10/2023 | Chen | B26B 19/20 |
| 2024/0058975 | A1* | 2/2024 | Wong | B26B 19/3886 |

FOREIGN PATENT DOCUMENTS

| | | | |
|---|---|---|---|
| CN | 110115558 | A | 8/2019 |
| DE | 102007008622 | A1 | 8/2008 |
| EP | 0325326 | A1 | 7/1989 |
| EP | 2926958 | A1 | 10/2015 |
| WO | 0249813 | A1 | 6/2002 |
| WO | 2008028332 | A1 | 3/2008 |
| WO | 2013082226 | A1 | 6/2013 |

* cited by examiner

SPACING ASSEMBLY FOR A HAIR COMB

CROSS-REFERENCE TO PRIOR APPLICATIONS

This application is the U.S. National Phase application under 35 U.S.C. § 371 of International Application No. PCT/EP2021/066532, filed on Jun. 18, 2021, which claims the benefit of European Patent Application No. 20182466.1, filed on Jun. 26, 2020. These applications are hereby incorporated by reference herein.

FIELD OF THE INVENTION

The present application is concerned with a spacing assembly, in particular a spacing assembly for adjusting the cutting length of a hair comb for a hair cutting device.

BACKGROUND OF THE INVENTION

Hair cutting devices, such as hair clippers and manual or electric razors, are used for trimming hair. The cutting element of a hair cutting device typically comprises a pair of comb-like blades which rapidly slide back and forth relative to each other in order to cut hairs positioned between the teeth of the blades with a scissor-like action. Such devices enable large numbers of hairs to be cut in a single stroke.

In order to guide hairs to the cutting element, hair cutting devices are sometimes provided with a hair comb that is attached to the hair cutting device and guides hairs as the comb is moved over the skin during a stroke of the hair cutting device through the hair. A comb typically comprises a support body that is attachable to the hair cutting device at a fixed position adjacent to the cutting element. Extending from the support body are a plurality of comb teeth for guiding hairs to the cutting element and which can be used to provide a spacing between the skin and the cutting element in order to define a remaining length of the hairs after cutting (i.e. a cutting length).

It is known to provide an adjustable comb, which includes a spacing mechanism that allows a user to manually adjust the cutting length of the hair comb by varying a distance separating a skin-contact portion of the comb teeth, which is for contacting and sliding movement over the skin of a user during a stroke, and the support body of the comb. This is typically achieved by providing the adjustable comb with a so-called "rack and pinion" type mechanism. For example, the comb may comprise a circular gear having a spindle that is connected to the support body and configured to engage a linear gear that is connected to the plurality of comb teeth. The user is able to rotate the circular gear which in turn translates the rotational motion into linear motion via the linear gear, to drive the comb teeth away from the support body. A problem with such combs, however, is that the spacing assembly significantly increases the size, weight and complexity of the overall comb.

SUMMARY OF THE INVENTION

According to a first specific aspect, there is provided a spacing assembly, comprising: a support body comprising a first guide track that extends in a spacing direction (e.g. a longitudinal direction of the support body) between a first end and a second end; a moveable body received in the first guide track, wherein the first guide track allows movement of the moveable body in the spacing direction and provides a lateral restriction to movement of the moveable body in a lateral direction perpendicular to the spacing direction; and an adjuster comprising a first spiral channel and a second spiral channel arranged about a common point on a surface of the adjuster. The support body comprises a first lug that is received within the first spiral channel and the moveable body comprises a second lug that is received within the second spiral channel, such that the adjuster is rotatable about the common point by sliding the first spiral channel and the second spiral channel on the first lug and second lug, respectively. The first spiral channel and the second spiral channel extend radially outwards in a curve of increasing radius from the common point, such that rotation of the adjuster will force the first lug and the second lug to move to different radial positions from the common point, thereby driving the adjuster and the moveable body, under the lateral restriction of the first guide track, to move relative to the support body in the spacing direction.

As will be described in further detail below, the spacing assembly described herein is suitable for spacing apart two articles, such as a support body and comb teeth of an adjustable hair comb, while obviating the need for a linear gear typically provided with conventional arrangements. This may reduce the number of mechanism parts and thus the overall complexity, size and cost of manufacturing the spacing assembly. Further, by driving the adjuster and the moveable body to move relative to the support body in the spacing direction, a controlled and continuous adjustment of the spacing distance between the moveable body and the support body can be realised.

The first guide track may be any one of the guide tracks described herein.

The first spiral channel and the second spiral channel may at least partly overlap. This may increase the extent by which the moveable body is able to be spaced from the support body, while using the space on the adjuster more effectively.

The adjuster may be in the form of a disk wheel rotatable by a user. This may be particularly ergonomic for the user.

The moveable body may be slidingly retained to the support body, e.g. by tongue and groove or tongue and lip pairs, in the spacing direction.

A spindle of the adjuster may be received in a second guide track of the spacing assembly, wherein the second guide track allows movement of the adjuster relative to the support body in the spacing direction and restricts movement of the adjuster in the lateral direction.

The second guide track may comprise a pair of ribs that defines a channel extending linearly in the spacing direction.

The adjuster may be rotatable between a first angular position at which the first lug and second lug are at radially inner positions of the first spiral channel and the second spiral channel, respectively, and a second angular position at which the first lug and the second lug are at radially outer positions of the first spiral channel and the second spiral channel, respectively. Rotation of the adjuster from the first angular position to the second angular position may increase the distance between the moveable body and a reference point on the support body in the spacing direction. By forcing the lugs to the radially outer ends of the channels to increase the separation between the support body and the moveable body, the adjuster can maximise the extent of separation for the size of the adjuster.

The first spiral channel and the second spiral channel may be rotationally symmetric. This may facilitate easier and smoother rotation of the adjuster.

The first spiral channel and the second spiral channel may have an angular separation of 180 degrees about the common point. For example, the radially outer ends of the channels may be located on opposite sides of the common point at circumferential positions (about the common point) that are 180 degrees apart from one another. This may maximise the extent of separation in the spacing direction.

The radially outermost ends of the first spiral channel and the second spiral channel may be aligned through the common point and may be positioned towards radially opposite sides of the adjuster. This may also maximise the extent of separation in the spacing direction.

The spacing assembly may be in the form of an adjustable hair comb. The support body may be configured to be attached to a hair cutting device at a fixed position with respect to a cutting element of the hair cutting device. The support body may be configured to be attached to (e.g. on) a cutting element only of the hair cutting device. In other embodiments, the support body may be configured to be attached to a main body (and optionally a part of the cutting element) of the hair cutting device at a fixed position with respect to a cutting element of the hair cutting device. The moveable body may comprise a set of comb teeth. Driving the moveable body to move relative to the support body in the spacing direction may adjust a distance separating a skin-contact surface of the comb teeth and the cutting element.

By implementing the spacing assembly as an adjustable hair comb, the technology described herein allows adjustment of a hair cutting length while obviating the need for a linear gear (e.g. rack and pinion as described above) typically provided with conventional arrangements. This may reduce the number of mechanism parts and thus the overall complexity, size and cost of manufacturing the device. It will be appreciated that a smaller mechanism may provide greater visibility of the blade during a stroke through the hair. This may improve the user's ability to guide the razor to a desired positions on the skin for precision trimming.

According to a second specific aspect, there is provided a kit comprising a hair cutting device and a spacing assembly in the form of an adjustable hair comb.

The hair cutting device may comprise a handle for being held by a user when rotating the adjuster.

According to a third specific aspect, there is provided a method of using a spacing assembly substantially as described above.

The method may comprise holding the support body at a fixed position while rotating the adjuster to drive the adjuster and the moveable body to move relative to the support body in the spacing direction.

The support body may be attached to a hair cutting device at a fixed position with respect to a cutting element of the hair cutting device. The moveable body may comprise a set of comb teeth. Rotating the adjuster may adjust a distance separating a skin-contact surface of the comb teeth and the cutting element.

The hair cutting device may comprise a handle that is held by a user to hold the support body at a fixed position while rotating the adjuster.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein. Indeed, these and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF THE EMBODIMENTS

Figure 1:
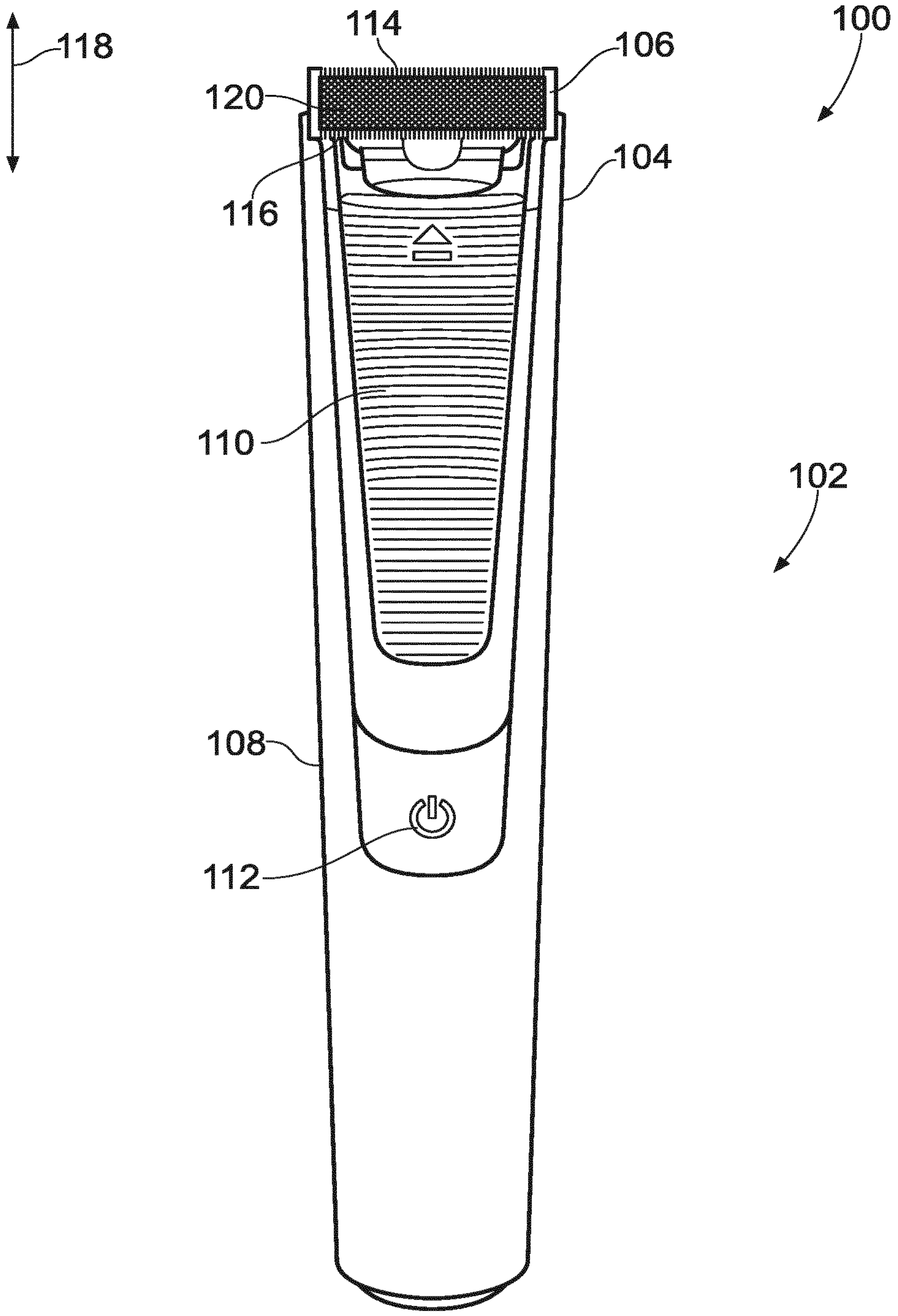
FIG. 1 is a front view of a hair cutting device comprising an electric razor.

Referring to FIG. 1, there is generally shown a hair cutting device 100 comprising an electric razor.

The electric razor 100 comprises an elongate body 102 having a cutting head 104 on which a cutting element 106 is attached and a handle portion 108 which generally extends away from the cutting head 104. The body 102 is generally formed by a housing which forms the external surface of the electric razor body.

The handle portion 108 is an elongate grippable portion by which a user can grip the electric razor 100 with their hand during use. The handle portion 108 is partially covered with a rubberised or textured surface 110 to facilitate better gripping of the electric razor 100 by a user, particularly when the handle portion 108 is wet. On a front face of the handle portion 108 a power button 112 is provided for powering the electric razor 100 on/off.

The cutting head 104 is arranged at an end of the handle portion 108. The cutting head 104 comprises the cutting element 106 of the electric razor 100. The cutting element 106 may comprise a first pair of static and reciprocating blades and a second pair of static and reciprocating blades. The blades combine to form a first cutting edge 114 and a second cutting edge 116 on laterally opposite sides of the cutting element 106. For each pair, the reciprocating blade is reciprocated relative to the static blade in a direction parallel to the cutting edge 114, 116, such that hairs positioned between the blade teeth are cut with a scissor-like action as the blade teeth move past one another. The reciprocating blade may be moved using a motor which powers a reciprocating mechanism (not shown) attached to the blade. The motor may be powered by a rechargeable battery contained within the housing of the electric razor 100. The motor can be selectively turned on and off using the power switch 112.

A cutting line 118 of the electric razor 100 is normal to the first and second cutting edges 114, 116. It should be understood that in order for hairs to easily enter the gaps between the blade teeth, they must approach the cutting edges along the cutting line 118. Therefore, the electric razor 100 cuts hair most effectively when moved in a direction along the cutting line 118.

An external surface 120 of the cutting element 106 which is between the first cutting edge 114 and the second cutting edge 116 in a direction along the cutting line 118 faces the skin in use. For a close shave, the skin-facing surface 120 is generally pressed lightly against the user's skin, and the electric razor 100 is slid along the user's skin in a direction along the cutting line 118, such that one of the cutting edges 114, 116 moves forward along the user's skin along the cutting line 118, to cut any hairs that it encounters.

Figure 2:
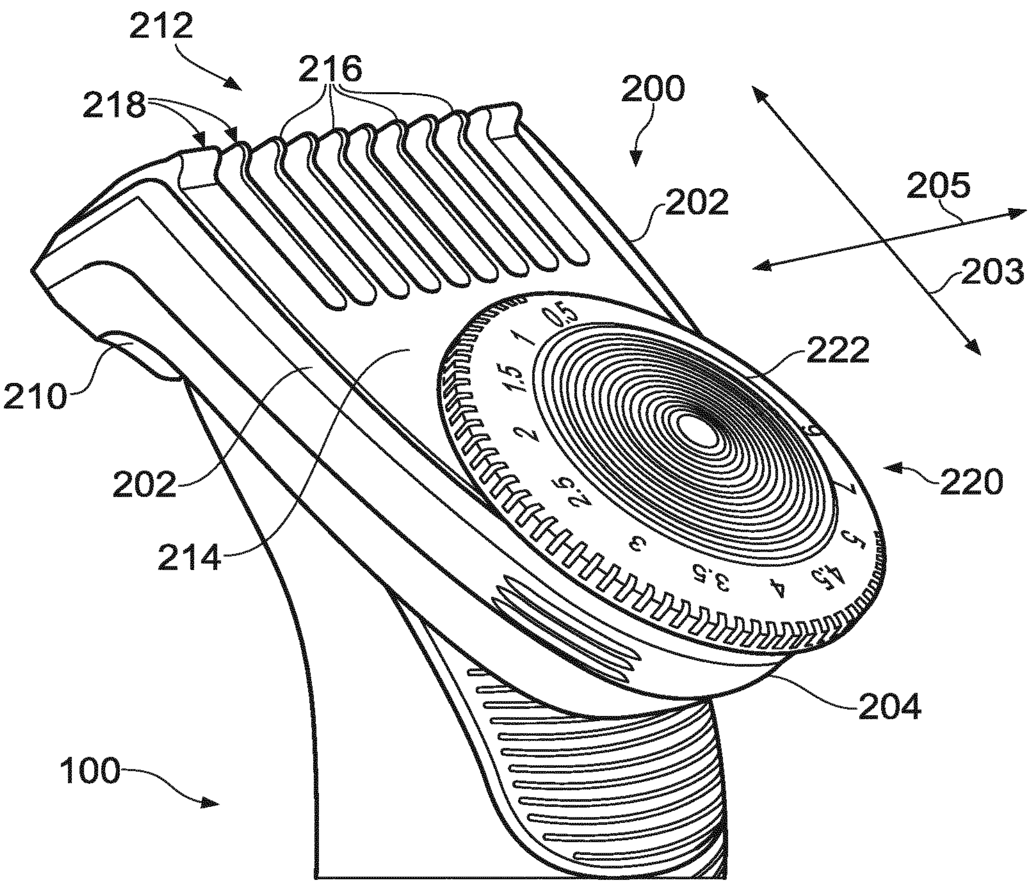
FIG. 2 is a perspective view of the hair cutting device of FIG. 1 together with an adjustable hair comb attached thereto.
Figure 3:
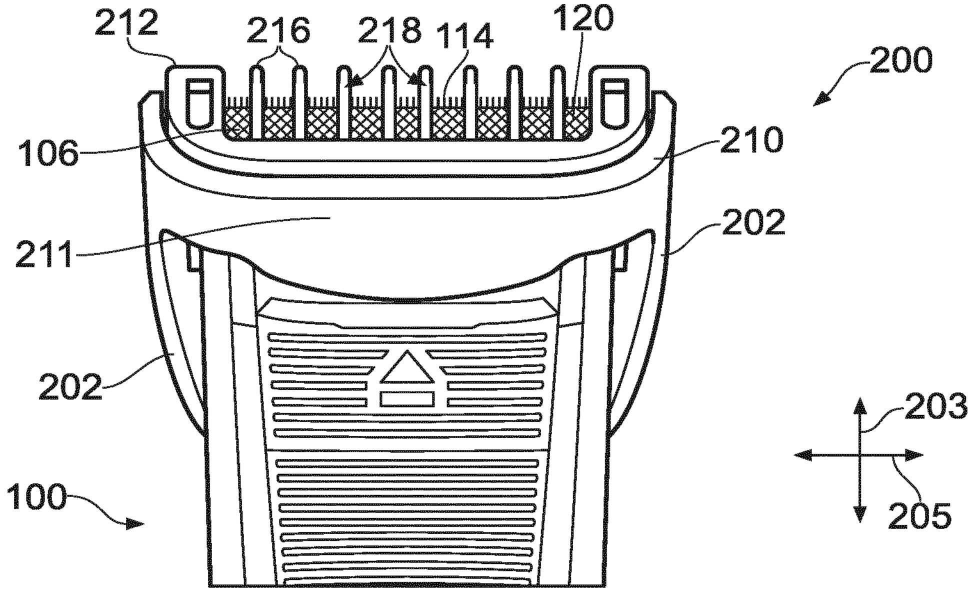
FIG. 3 is a front view of the hair cutting device and adjustable hair comb of FIG. 2.

Referring to FIGS. 2 and 3, there is generally shown a hair cutting kit comprising the electric razor 100 of FIG. 1 and an adjustable hair comb 200. The comb 200 guides and lifts hairs to be cut so that the cutting element 106 (shown in FIG. 3) can cut them effectively and efficiently.

The comb 200 comprises a support body 210 having two side elements 202 extending in a longitudinal direction 203 of the comb 200. The two side elements 202 are connected together and spaced apart in a lateral direction 205 of the comb 200 (perpendicular to the longitudinal direction 203) by a rear connecting portion 204. The distance between the side elements 202 (and thus the lateral extent of the connecting portion 204) is substantially equal to the length of the cutting element 106 of the electric razor 100, such that the comb 200 can be mounted on the razor 100 with the cutting element 106 received between the frame elements 202.

The rear connecting portion 204 is formed at a rearward edge of the support body 210 and the side elements 202 extend forwardly from the rear connecting portion 204 in the longitudinal direction 203. As best shown in FIG. 3, the side elements 202 are connected at their forward end (i.e. furthest from the rear connecting portion 204 in the longitudinal direction 203) by a forward connecting portion 211. The forward connecting portion 211 has an inwardly facing surface (not shown) that is configured to abut the second cutting edge 116 of the cutting element 106 when the comb 200 is connected thereto.

A connection feature (not shown) may be provided on the rear connecting portion 204 of the support body 210 for engaging a corresponding connection feature on the electric razor 100. The connection features may enable the hair comb 200 and the hair cutting device 100 to be connected via a so-called "snap fit". For example, the connection feature on the rear connecting portion 204 may be a protruding member suitable for being snugly received (inserted) into a mutually-shaped opening on the electric razor 100, for attaching the comb 200 to the electric razor 100. Further, a distance separating the protruding member from the forward connecting portion 211 of the support body 210 in the longitudinal direction 203 may be substantially equal to a distance separating the cutting element 106 and the opening on the electric razor 100 that is for receiving the protruding member, such that the comb 200 can be mounted tightly and securely on the electric razor 100. The snap-fit may be reversed to remove the comb 200 upon a force applied by the user. Other means for securely attaching the comb 200 to the electric razor 100 are possible. In some embodiments, the support body 210 is formed as an integral part of the cutting device.

The comb 200 further comprises a moveable body 212 that is supported by, and retained to, the support body 210. The moveable body 212 comprises a substantially planar section 214 at a rearward side of the moveable body 212. A plurality of elongate protrusions 216 of the moveable body 212 extend forwardly from the planar section 214 in the longitudinal direction 203 by a uniform length. The protrusions 216 form a set of comb teeth arranged in a side-by-side arrangement along a direction parallel to the cutting edge 114. The first cutting edge 114 of the razor 100 is exposed in gaps between adjacent comb teeth 216 in the lateral direction 205, to allow hairs received in the gaps to be cut by the cutting element 106.

The comb teeth 216 generally extend longitudinally in parallel directions substantially perpendicularly to the cutting edge 114 and away from the planar section 214 towards the surface of the skin on which hairs to be cut are located. Each one of the comb teeth 216 includes a skin-contact surface 218 at its forward end (i.e. furthest from the planar section 214 in the longitudinal direction 203), which is for contacting and sliding movement over the skin of a user during a stroke.

The comb teeth 216 and their skin-contact surfaces 218 extend forward of the cutting element 106 and the forward connecting portion 211 of the support body 210 in the longitudinal direction 203, to provide a spacing between the skin of a user and the external surface 120 of the cutting element 106 in order to define a hair cutting length, i.e. the length of the hairs after cutting.

The cutting length of the comb 200 is adjustable by a spacing mechanism 220 that is operable by a user to set and/or adjust a distance between the skin-contact surfaces 218 of the comb teeth 216 and the external surface 120 (and thus the first cutting edge 114) of the cutting element 106 (or rather the forward connecting portion 211 or other fixed position on the support body 210). The spacing mechanism 220 comprises an adjuster 222, which in this example is a diskwheel (although any knob structure may be suitable), that is connected to both the support body 210 and the moveable body 212 and is operable under rotation to drive the moveable body from the support body 210 in a spacing direction parallel to the longitudinal direction 203 of the comb 200. That is, the mechanism 220 is able to translate rotational movement of the diskwheel 222 (by a user) into linear motion, as will be described in further detail below with respect to FIG. 7.

Figure 4:
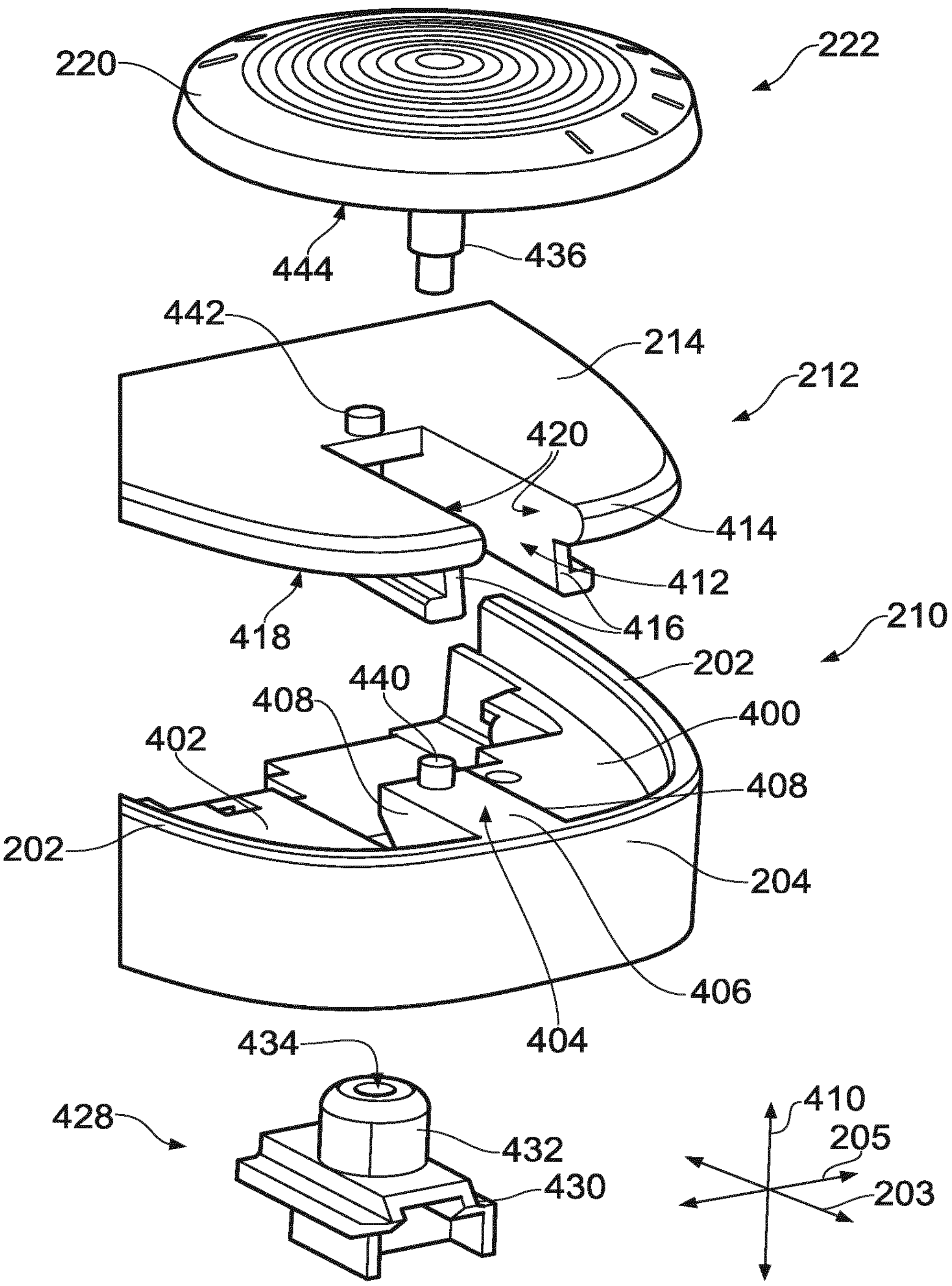
FIG. 4 is an exploded view of the rear part of the adjustable hair comb of FIGS. 2 and 3, in accordance with an example embodiment.
Figure 5:
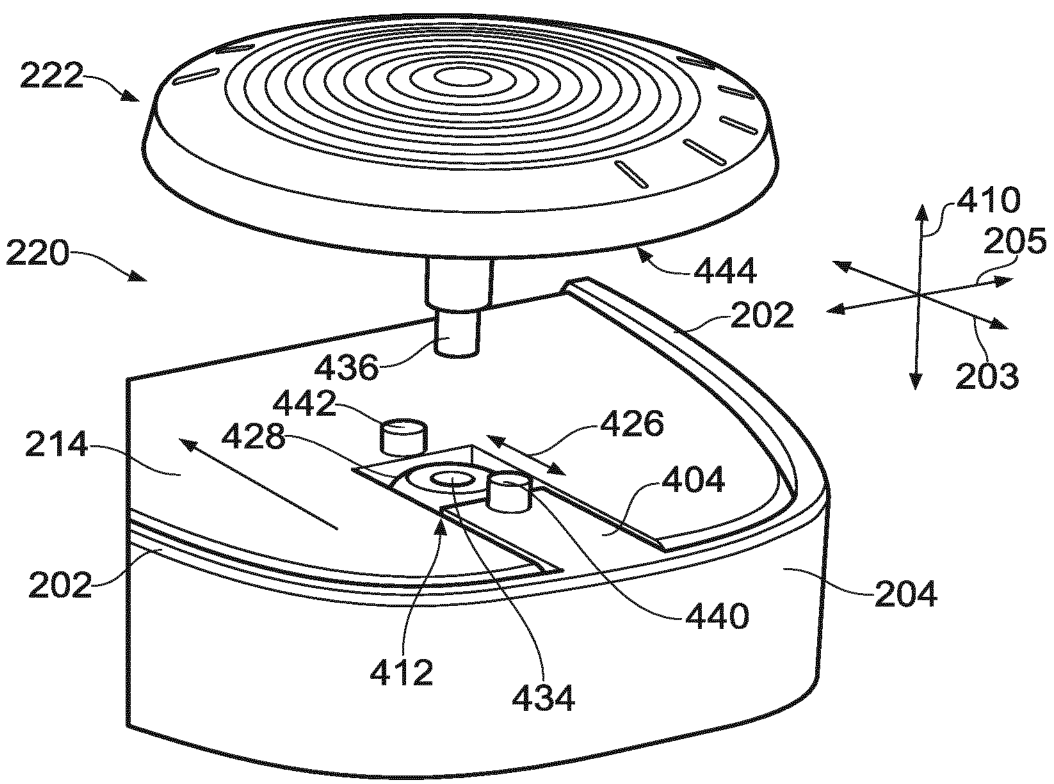
FIG. 5 is a partially exploded view of a rear part of the adjustable hair comb of FIG. 4.
Figure 6:
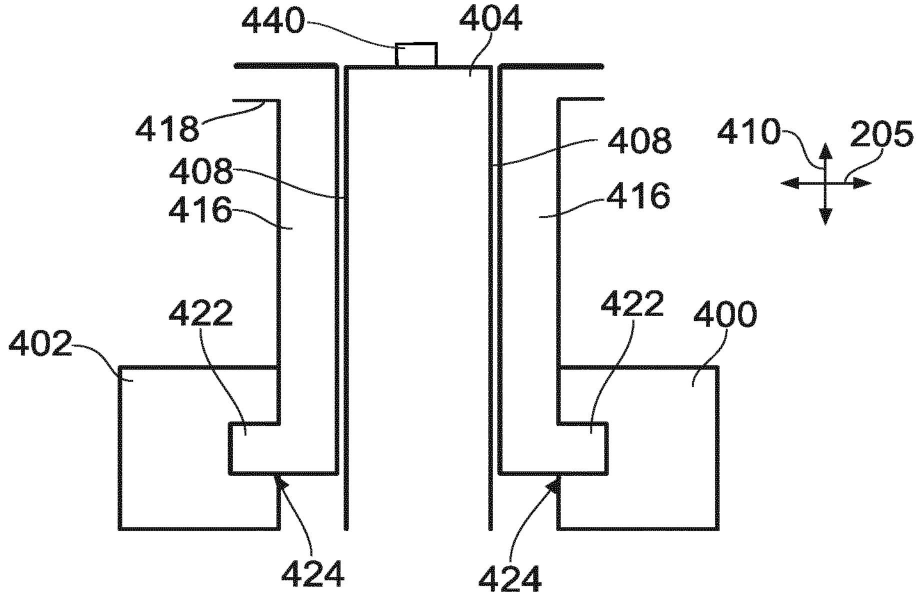
FIG. 6 is a schematic representation of a guide track of the adjustable hair comb of FIGS. 4 and 5.

Referring to FIGS. 4 to 6, the moveable body 212 and the support body 210 are configured to co-operate with each other to allow relative movement between them in the longitudinal direction 203.

As best shown in FIG. 4, the support body 210 comprises a first planar platform 400 and a second planar platform 402. Each platform 400, 402 extends from a first end adjacent the rear connecting portion 204 to a second end that is forwards of the rear connecting portion 204 in the longitudinal direction 203. The first platform 400 and the second platform 402 abut and support an underside 418 of the moveable body 212 which is received in a space between the side elements 202 of the support body 210.

The distance between the side elements 202 of the support body 212 in the lateral direction 205 is substantially equal to a lateral extent of the moveable body 212 (particularly the planar section 214). Additionally, the perimeter edge of the moveable body 212 may conform to a shape defined by the side elements 202 and the rear connecting portion 204 of the support body 212. In this way, the moveable body 212 is restricted in the lateral direction 205 but able to slide along the first and second platforms 400, 402 in the longitudinal direction 203. In this way, it can be said that the first platform 400 and the second platform 402 define, together with the side elements 202 of the support body 212, a guide track that allows the moveable body 212 to move (by sliding action) in the longitudinal direction 203 but not the lateral direction 205.

The support body 210 further comprises an arm 404 that extends from the rear connecting portion 204 in a forwards direction in the longitudinal direction 203. The arm 404 is substantially cuboidal in structure and comprises an upper planar surface 406 and two planar side surfaces 408 extending perpendicularly from the upper planar surface 406 in a vertical direction 410 (which is itself perpendicular to the longitudinal and lateral directions 203, 205). The upper planar surface 406 is parallel to both the first platform 400 and the second platform 402, but is offset therefrom (at a higher position) in the vertical direction 410.

The planar section 214 of the moveable body 212 has a rectangular-shaped cut or slot 412 that extends longitudinally from a rearward end 414 of the moveable body 212 opposite the set of comb teeth. At laterally opposite sides of the slot 412, there are protruding walls 416 that extend perpendicularly from the underside 418 of the planar section 214 in the vertical direction 410. The protruding walls 416 have inner, planar surfaces 420 that are spaced apart but face each other in the lateral direction 205. The protruding walls 416 define a space that receives the arm 404 of the support body 210 therebetween. The lateral extent of the arm 404 is substantially equal to a distance between the planar surfaces 420 of the slot 412, such that the arm 404 is snugly received within the space defined by the slot 412 with a sliding fit.

The moveable body 212 is slidingly retained to the support body 210 by tongue and groove pairs extending between a first end and a second end in the longitudinal direction 203 of the comb 200. As best illustrated by FIG. 6, the protruding walls 416 of the moveable body 212 comprise tongues (or tabs) 422 that extend away from each other in the lateral direction 205. The first platform 400 and the second platform 402 each comprises a longitudinally extending channel or groove 424, wherein the grooves 424 face each other in the lateral direction 205. The tongues 422 and grooves 424 correspond to each other in that they are suitably dimensioned for mutual engagement.

The tongue and groove arrangement is configured such that when the tongues 422 of the moveable body 212 are engaged with (and received in) respective grooves 424 of the support body 210, as shown, the moveable body 212 is restricted in the lateral direction 205 but not the longitudinal direction 203. In this way, it can be said that the support body 210 comprises a guide track that allows (sliding) movement of the moveable body 212 relative to and along the (grooves 424 of) support body 210 between the first end and the second end of the tongue and groove arrangement in the longitudinal direction 203.

While the example arrangement shown in FIGS. 4 and 6 includes two tongues 422 and two grooves 424 on the moveable body 212 and the support body 210, respectively, this is not required. In other arrangements, the tongues 422 and grooves 424 may instead be formed on the support body 210 and moveable body 212, respectively. Further, the tongue and groove arrangement need not be provided on the protruding walls 416 and platforms 400, 402 specifically, but may instead be provided on any part of the comb as may be desired to allow sliding movement between the moveable body 212 and support body 210.

Furthermore, although the moveable body 212 and the support body 210 of FIGS. 4 to 6 are slidingly retained by tongue and groove pairs, this is not required. Any suitable means for slidingly retaining the moveable body 212 to the support body 210 is possible. For example, the moveable body 212 may be slidingly retained to the support body 210 by tongue and lip pairs. That is, one of the moveable body 212 and the support body 210 may comprise at least one tongue and the other one of the moveable body 212 and the support body 210 may comprise at least one corresponding lip (or shoulder). In such arrangements the tongue and lip of a given pair will abut, for example a lower surface of the lip (in the vertical direction 410) may abut an upper surface of the tongue, i.e. a surface of the tongue that faces the underside 418 of the moveable body 212, and allow sliding movement relative to one another.

As best shown in FIGS. 4 and 5, the arm 404 extends from the rear connecting portion 204 by a distance that is less than a longitudinal extent of the slot 412 such that, when the rearward end 414 of the moveable body 212 abuts the rear connecting portion 204, there will be a space 426 defined between the forward ends of the arm 404 and slot 412. Within the space 426, there is a slider element 428 comprising a base 430 and a pillar portion 432 extending from the base 430. The pillar 432 is in the form of a hollow cylinder or tube having a central bore 434 for receiving a spindle 436 of the diskwheel 222. The spindle 436, and thus the diskwheel 222, is rotatable within the central bore 434 about a central axis of the bore 434.

In other embodiments, however, the spindle 436 may be fixed to the slider element 428 in a manner that does not allow rotation of the spindle with respect to the slider element 428. For example, the central bore 434 and spindle may not be round (i.e. circular) in cross-section, but may for example be oval-shaped in cross-section, to prevent rotation of the spindle. In such arrangements, the diskwheel 222 may be configured to rotate about the spindle 436 when actuated.

Further, the components (e.g. the diskwheel, moveable body, support body and the sliding element) of the adjustable comb may be held together in the vertical direction 410. For example, the spindle of the diskwheel may be riveted (or otherwise fixed) to the sliding element 428.

As the moveable body 212 slides in the longitudinal direction 203, the space 426 will increase in length such that the slider 428 may also be moved (i.e. slide) in the longitudinal direction 203. The base 430 of the slider 428 has a lateral extent that is substantially equal to the distance between the planar surfaces 420 of the protruding walls 416, such that the protruding walls 416 of the moveable body 212 define a guide track that allows movement of the slider 428 and diskwheel 222 (relative to the support body 210 and the moveable body 212) in the longitudinal direction 203, but restricts their movement in the lateral direction 205. In this way, the adjustable comb 200 allows the diskwheel 222 and the moveable body 212 to move relative to the support body 210 in the longitudinal direction 203.

As mentioned above, the spacing mechanism 220 comprises a diskwheel 222 that is connected to both the support body 210 and the moveable body 212 and is operable under rotation to drive movement of the moveable body 212 relative to the support body 210. To facilitate this, the arm 404 of the support body 210 comprises a first lug (protrusion) 440 that extends vertically upwards from the upper planar surface 406. The first lug 440 is located at a fixed position on the support body 210. The moveable body 212 also comprises a second lug 442, which extends vertically upwards from the planar section 214. The first lug 440 and the second lug 442 are substantially cylindrical in that they each have a circular shape in cross-section. The first lug 440, the second lug 442 and the pillar 432 of the slider 428 are aligned in the longitudinal direction 203. Further, the first lug 440 and the second lug 442 are located at equidistant positions from the pillar 432 on opposite sides of the pillar 432 in the longitudinal direction 203.

The first lug 440 and the second lug 442 are configured to co-operate with and engage an underside surface 444 of the diskwheel 222, when the spindle 436 of the diskwheel 222 is received in the bore 434 of the pillar 432, to form the spacing mechanism by which the diskwheel 222 may be rotated to drive the moveable body 212 in the longitudinal direction 203. The spacing mechanism will now be described in further detail with respect to FIG. 7.

Figure 7:
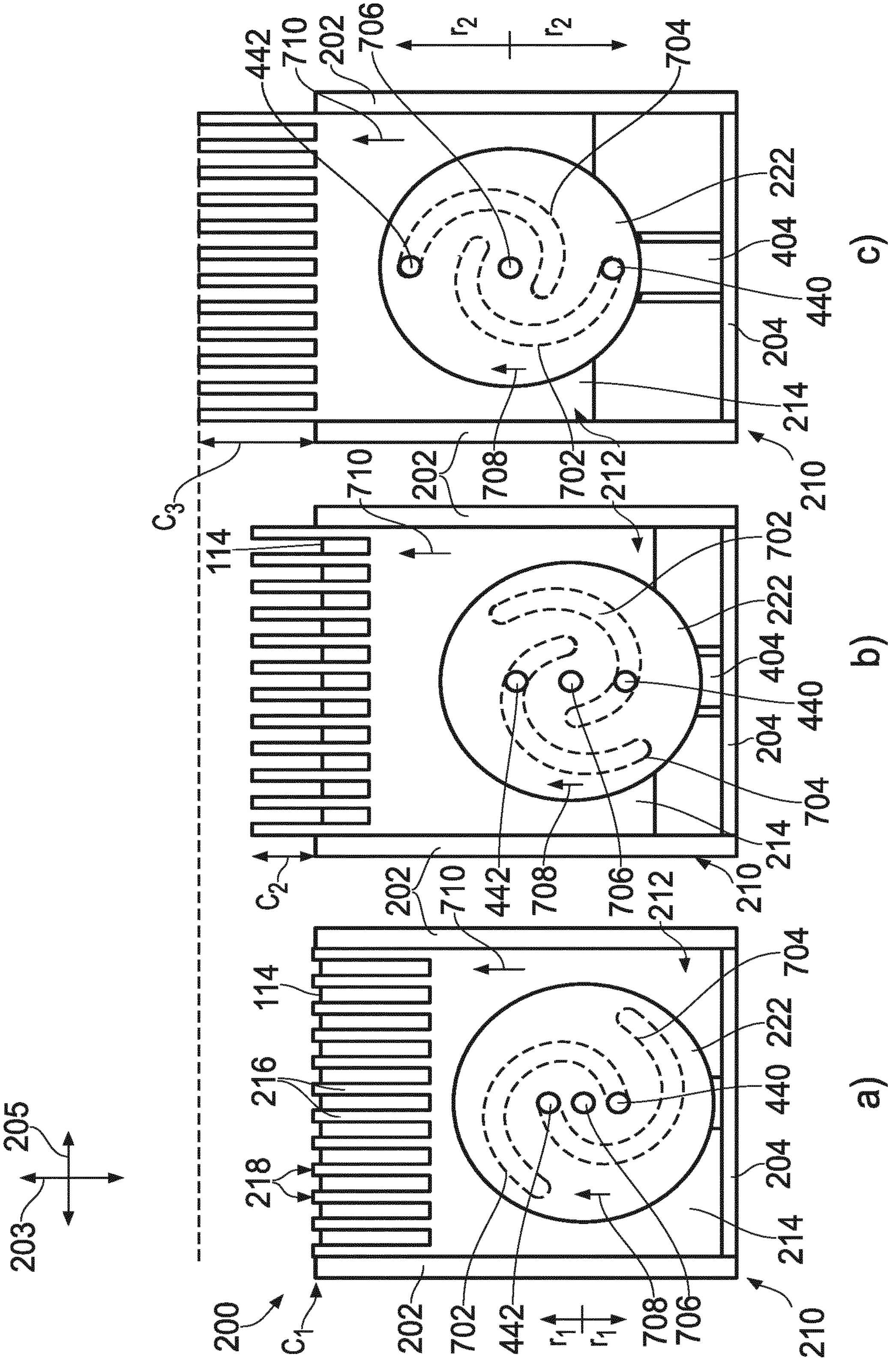
FIG. 7 is a schematic representation of the adjustable hair comb of FIGS. 4 to 6, in use.

FIG. 7 is a schematic representation of the adjustable hair comb of FIGS. 4 to 6, in use at three different stages (as represented by sub-FIGS. 7*a*, 7*b* and 7*c*). For ease of explanation, FIG. 7 shows the diskwheel 222 and wider comb 200 in top view, but with features on the underside surface of the diskwheel 222, i.e. the bottom surface facing the moveable body 212, shown in dashed lines.

The underside surface of the diskwheel 222 is a, e.g. substantially planar, surface that comprises a first spiral channel 702 and a second spiral channel 704 arranged (e.g. centred) about a common point 706 on the surface. The common point 706 on the adjuster plate is a point through which the axis of rotation of the diskwheel 222 extends. In that regard, the common point 706 is a position on the underside of the diskwheel 222 from which the spindle (see reference 436 of FIGS. 4 to 6) protrudes. The first and second spiral channels 702, 704 may be surface indentations on the underside of the diskwheel 222, or may be in the form of slots, i.e. holes, through the underside of the diskwheel 222.

The first and second spiral channels 702, 704 are suitably dimensioned for mutual engagement with the first and second lugs 440, 442, respectively. In particular, the width of the indentations or slots forming the first and second channels 702, 704 are substantially equal to, or slightly larger than, the cross-sectional diameters of the first and second lugs 440, 442, such that the first lug 440 can be (and is) slidingly received within the first spiral channel 702 and the second lug 442 can be (and is) slidingly received within the second spiral channel 704.

The first and second spiral channels 702, 704 may be uniformly shaped. This may be achieved in that each channel extends in a (smooth) line of continuous curvature having the same degree of curvature along their length. However, in other embodiments, the channels need not extend in a smooth line of continuous curvature, but may instead extend in a line having a series of distinct stages (i.e. the channels may extend in a step-wise manner) that together form a curved spiral profile.

Further, the channels 702, 704 may be rotationally symmetric about the common point 706 and have discrete rotational symmetry of the 2nd order. That is, the first and second spiral channels 702, 704 are separated by 180 degrees about the common point 706. Accordingly, when the first and second protrusions 440, 442 are engaged with (received in) the first and second spiral channels 702, 704, respectively, an applied torque from a user (represented by arrow 708 of FIGS. 7*a*, 7*b* and 7*c*) will cause the diskwheel 222 to rotate about the common point 706. During rotation, the first and second spiral channels 702, 704 will slide concurrently on the first and second lugs 440, 442, respectively, such that the lugs 440, 442 will take different positions along their respective spiral channels 702, 704.

The first spiral channel 702 and the second spiral channel 704 are shaped to define continuously widening curves that extend radially outwards with increasing radius from the common point 706. In other words, each channel 702, 704 has a first end and a second end, wherein the radial distance between a position in the channel and the common point 706 continuously increases for different positions in the channel from the first end to the second end. For example, a position at the first end of the channel is at a radially inner position of the diskwheel 222 (and is thus closer to the common point 706) and a position at the second end of the channel is at a radially outer position of the diskwheel 222 (and is thus further from the common point 706 than the first end).

By providing spiral channels 702, 704 as described above, rotation of the diskwheel 222 will force the first lug 440 and the second lug 442, under the lateral restriction of guide tracks, to change their radial positions with respect to the common point 706. Specifically, the diskwheel is rotatable between a first angular position, at which the first and second lugs 440, 442 are at radially inner positions of their respective first and second spiral channels 702, 704, as shown in FIG. 7*a*, and a second angular position, at which the first and second lugs 440, 442 are at radially outer positions of their respective first and second spiral channels 702, 704, as shown in FIG. 7*c*. The diskwheel 222 is also able to be rotated to and set at intermediate angular positions between the first and second angular positions, at which the first and second lugs 440, 442 are at intermediate radial positions from the common point 706, such as those shown in FIG. 7*b*.

The radial distance, "$r_1$", between the first lug 440 and the common point 706 (and also the second lug 442 and the common point 706), when the diskwheel 222 is at the first angular position, is less than the radial distance, "$r_2$", between the first lug 440 and the common point 706 (and also the second lug 442 and the common point 706), when the diskwheel 222 at the second angular position.

By forcing the first lug 440 and the second lug 442 to change their radial positions on rotation of the diskwheel between the first and second singular positions, the moveable body 212, in particular the planar section 214 and comb teeth 216, is driven to move relative to the rear connecting portion 204 of (and other reference points on) the support body 210. That is, it is possible to translate a torque on the diskwheel 222 (as applied by the user) into a linear force (indicated by arrow 710 in FIG. 7) that drives the moveable body 212 and the diskwheel 222 to translate relative to the support body 210 in the longitudinal direction 203 (forwards or backwards depending on the direction of torque/rotation).

In use, the support body 210 will be held at a fixed position (as it is anchored to the electric razor held by the user) and rotation of the diskwheel 222 will vary the extent by which the skin-contacting surfaces 218 of the comb teeth 216 uniformly extends forward of the cutting edge 114 of the cutting element 106 and thus the cutting length, "c". As shown in FIGS. 7*a* and 7*c*, the cutting length, "$c_1$", of the comb 200 when the diskwheel 222 is at the first angular position, is less than the cutting length, "$c_3$", when the diskwheel 222 at the second angular position. Further, as shown in FIG. 7*b*, the cutting length, "$c_3$", of the comb 200 when the diskwheel 222 is at the intermediate angular position is more than the first cutting length but less than the second cutting length.

The radial span of each spiral channel, i.e. the distance between the first and second ends of the channel in question, defines half of the longitudinal extent by which the moveable body 212 can translate relative to the support body 210, and thus half the maximum cutting length of the comb. Correspondingly, the sum of the radial spans of both the first and second spiral channels defines the full extent by which the moveable body 212 can translate relative to the support body 210 and thus the maximum cutting length of the comb.

To maximise the extent of translation, the second ends of the first and second spiral channels 702, 704 are aligned through the common point 706 and are positioned towards radially opposite sides of the diskwheel 222.

Although the adjustable comb has been described above as having the specific configuration shown in FIGS. 4 to 7, variations to the disclosed embodiments are possible.

Figure 8:
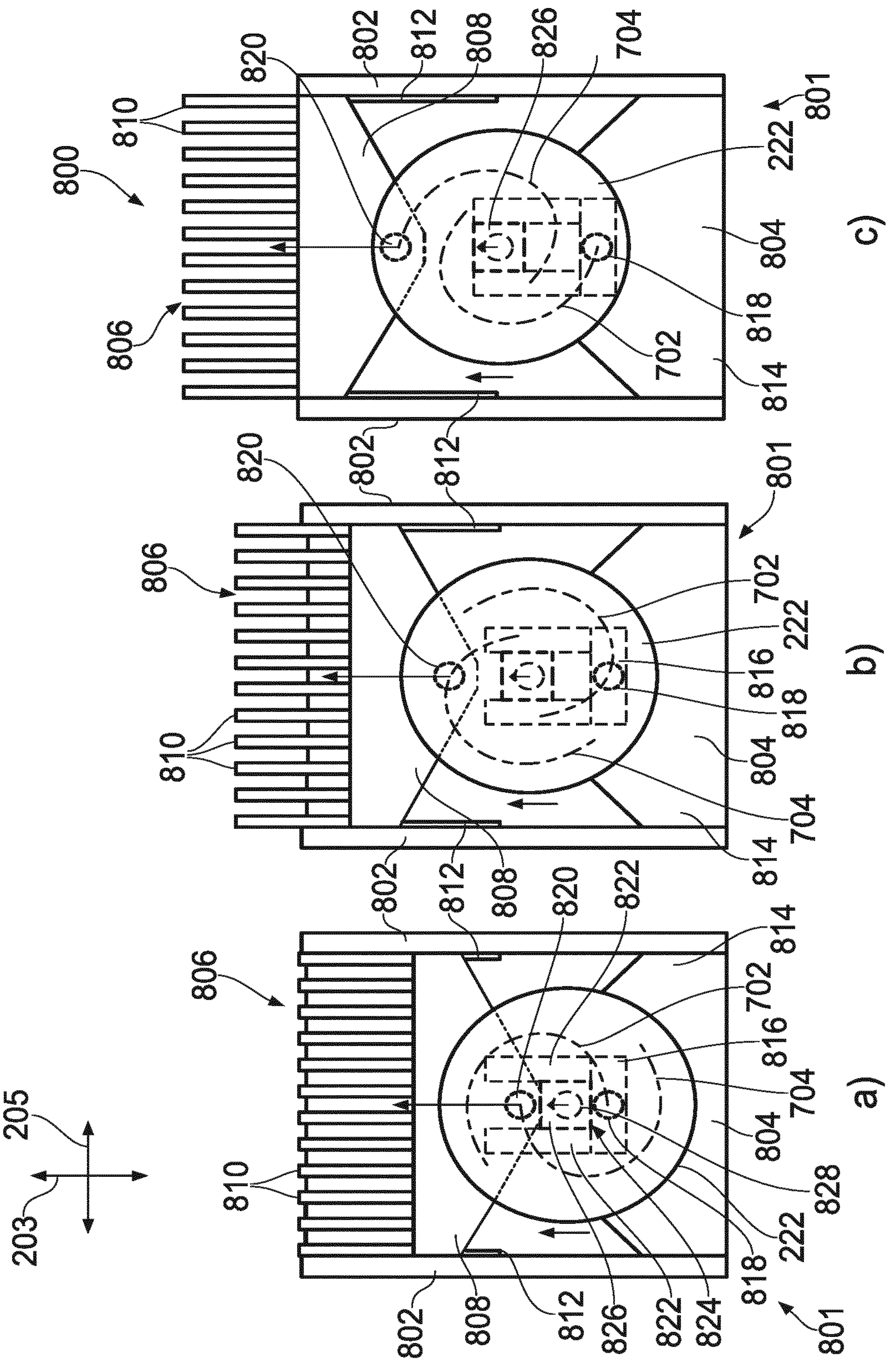
FIG. 8 is a schematic representation of the adjustable hair comb of FIGS. 2 and 3, in accordance with another example embodiment.

FIG. 8 is a schematic illustration of an adjustable hair comb in use at three different stages (as represented by sub-FIGS. 8*a*, 8*b* and 8*c*), in accordance with another embodiment of the technology described herein.

The adjustable hair comb 800 comprises a support body 801, having side elements 802 that extend parallel from a rear connecting portion 804, and a moveable body 806, having a planar section 808 and a set of comb teeth 810 extending from the planar section 808 in a forwards direction away from the rear connecting portion 804 in the longitudinal direction 203. The moveable body 806 is mounted on a guide track, which in this example is in the form of two platforms 812, each of which extends inwards from a respective side element 802. The lateral width of the moveable body, specifically the planar section 808, is substantially equal to or slightly less than the distance separating the side elements 802 to allow sliding movement of the moveable body along the platforms 812 in the longitudinal direction 203, while restricting movement in the lateral direction 205. The spacing mechanism of the adjustable hair comb 800 is similar to that of FIGS. 4 to 7 in that it comprises a diskwheel 222 having a first spiral channel 702 and a second spiral channel 704 on an underside surface of the diskwheel, to engage corresponding lugs on the support body 801 and the moveable body 806, respectively.

In contrast to the arrangement of FIGS. 4 to 7, however, the rear connecting portion 804 is itself shaped to define an arm 814 that extends forwards in the longitudinal direction 203. The arm 814 tapers in the longitudinal direction 203 from the rear of the support body 801. At the tapered, forward end of the arm 814, there is a pillar 816 that extends vertically upwards from the arm 814 and along a lateral extent of the comb 800. An upper surface of the pillar 816, which faces the underside of the diskwheel 222, comprises a first lug 818 that protrudes vertically from the pillar 814. Further, the moveable body 808 does not comprise a slot, but instead tapers in the rearward direction to an end point of the moveable body 808, at which there is a second lug 820 extending vertically upwards from the body.

In further contrast to the embodiment of FIGS. 4 to 7, the moveable body 806 is not retained to the support body 801 by a guide track comprising tongue and groove pairs. Further, in this example embodiment the support body 801 has two ribs 822 extending parallel to each other in the longitudinal direction 203, from a point on a front facing surface 824 of the pillar 816. The two ribs 822, together with the front facing surface 824, define a guide track for a slider 826 (such as that described above with respect to FIGS. 4 to 7). A spindle portion extends from the underside of the diskwheel 222 at a common point between the two spiral channels 702, 704 on the underside of the diskwheel 22, and is received in a central bore 828 of the slider 826. In this way, the guide track allows movement of the slider 826 and diskwheel 222 relative to the support body 801 in the longitudinal direction 203 and restricts movement of the diskwheel in a lateral direction 205 of the guide track.

The first lug 818 is received within the first spiral channel 702 of the diskwheel 222 and the second lug 820 is received within a second spiral channel 704 of the diskwheel 222, such that the diskwheel 222 is rotatable about a common point by forcing the first and second channels 702, 704 to slide on the respective lugs 818, 820. In the same manner as that described above with respect to FIGS. 4 to 7, rotation of the diskwheel 222 changes the radial positions of the first and second lugs 818, 820, thereby driving the diskwheel 222 and the moveable body 806 to move relative to the support body 801 in the longitudinal direction 203.

In the manner described above, the technology described herein provides an adjustable hair comb having a spacing mechanism that allows adjustment of a hair cutting length, while obviating the need for a linear gear typically provided with conventional arrangements. This may reduce the number of mechanism parts and thus the overall complexity, size and cost of manufacturing the device. Additionally, reducing the size of the mechanism may provide greater visibility of the blade during a stroke through the hair. This may improve the user's ability to guide the razor to a desired positions on the skin for precision trimming.

Additionally, by using spiral-shaped channels to guide movement of the first and second lugs, the cutting length of the comb can be continuously adjusted, as opposed to hypothetical spacing actuators in which incremental, stepwise adjustments are made. This may increase the level of control by which a user can set the cutting length. However, it will be appreciated that in embodiments, the spacing mechanism may be provided with a locking mechanism, which may be incorporated into the diskwheel, to ensure that the user can set the length of the hair comb at a specific hair cutting length. Any locking mechanism known in the art could be used for this purpose.

There may also be an advantage to using two spiral channels as opposed to hypothetical arrangements in which a single such channel is used. In that regard, as each spiral channel accommodates for half the travel distance of the moveable object, the same total cutting length as a single-spiral channel may be achieved, but with a smaller diameter size for the diskwheel. Conversely, using a double spiral mechanism may enable a larger maximum cutting length to be set, as compared to hypothetical arrangements in which a single spiral channel is used on a diskwheel of the same size.

Further, the two spiral channels may at least partly overlap in the radial direction to achieve the same total cutting length as a single-spiral channel, but with a smaller diameter size for the diskwheel. For example, as best shown in FIG. 7, the spiral channels may overlap in that the first end of the first spiral channel 702 is located between the first and second ends of the second spiral channel 704 (i.e. on the concave side of the second spiral channel 704). Correspondingly, the first end of the second spiral channel 704 is located between the first and second ends of the first spiral channel 702 (i.e. on the concave side of the first spiral channel 702).

It will be appreciated that, although the spacing mechanism has been described above with respect to one specific example application in an adjustable hair comb, the spacing mechanism is applicable more widely to any spacing assembly in which it may be desirable to space apart two articles in a spacing direction. For example, the support body need not be a support body attachable to a hair cutting device and the moveable body need not comprise a plurality of comb teeth. Indeed, the support body and moveable body may take any suitable or desired form falling within the scope of the claims.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A spacing assembly, comprising:
- a support body comprising a first guide track that extends in a spacing direction between a first end and a second end;
- a moveable body received in the first guide track, wherein the first guide track allows movement of the moveable body in the spacing direction and provides a lateral restriction to movement of the moveable body in a lateral direction perpendicular to the spacing direction; and
- an adjuster comprising a first spiral channel and a second spiral channel arranged about a common point on a surface of the adjuster;
- wherein the support body comprises a first lug that is received within the first spiral channel; and the moveable body comprises a second lug that is received within the second spiral channel, such that the adjuster is rotatable about the common point by sliding the first spiral channel and the second spiral channel on the first lug and second lug, respectively;
- wherein the first spiral channel and the second spiral channel extend radially outwards in a curve of increasing radius from the common point, such that rotation of the adjuster will force the first lug and the second lug to move to different radial positions from the common point, thereby driving the adjuster and the moveable body, under the lateral restriction of the first guide track, to move relative to the support body in the spacing direction.

2. A spacing assembly as claimed in claim 1, wherein the first spiral channel and the second spiral channel at least partly overlap.

3. A spacing assembly as claimed in claim 1, wherein the moveable body is slidingly retained to the support body by tongue and groove or tongue and lip pairs extending in the spacing direction.

4. A spacing assembly as claimed in claim 1, wherein a spindle of the adjuster is received in a second guide track of the spacing assembly, wherein the second guide track allows movement of the adjuster relative to the support body in the spacing direction and restricts movement of the adjuster in the lateral direction.

5. A spacing assembly as claimed in claim 4, wherein the second guide track comprises a pair of ribs that defines a channel extending linearly in the spacing direction.

6. A spacing assembly as claimed in claim 1, wherein:
- the adjuster is rotatable between a first angular position at which the first lug and second lug are at radially inner positions of the first spiral channel and the second spiral channel, respectively, and a second angular position at which the first lug and the second lug are at radially outer positions of the first spiral channel and the second spiral channel, respectively; and
- rotation of the adjuster from the first angular position to the second angular position will increase the distance between the moveable body and a reference point on the support body in the spacing direction.

7. A spacing assembly as claimed in claim 1, wherein the first spiral channel and the second spiral channel are rotationally symmetric.

8. A spacing assembly as claimed in claim 7, wherein the first spiral channel and the second spiral channel have an angular separation of 180 degrees about the common point.

9. A spacing assembly as claimed in claim 1, wherein the radially outermost ends of the first spiral channel and the second spiral channel are aligned through the common point and are positioned towards radially opposite sides of the adjuster.

10. A spacing assembly as claimed in claim 1, wherein the spacing assembly is in the form of an adjustable hair comb in that:
- the support body is configured to be attached to a hair cutting device at a fixed position with respect to a cutting element of the hair cutting device;
- the moveable body comprises a set of comb teeth; and
- driving the moveable body to move relative to the support body in the spacing direction adjusts a distance separating a skin-contact surface of the comb teeth and the cutting element.

11. A kit comprising a hair cutting device and a spacing assembly as claimed in claim 10.

12. A kit as claimed in claim 11, wherein the hair cutting device comprises a handle for being held by a user when rotating the adjuster.

13. A method of using a spacing assembly as claimed in claim 1, comprising:
- holding the support body at a fixed position while rotating the adjuster to drive the adjuster and the moveable body to move relative to the support body in the spacing direction.

14. A method as claimed in claim 13, wherein:
- the support body is attached to a hair cutting device at a fixed position with respect to a cutting element of the hair cutting device;
- the moveable body comprises a set of comb teeth; and
- rotating the adjuster adjusts a distance separating a skin-contact surface of the comb teeth and the cutting element.

15. A method as claimed in claim 13, wherein the hair cutting device comprises a handle that is held by a user to hold the support body at a fixed position while rotating the adjuster.

* * * * *